(12) United States Patent
Herasimchuk

(10) Patent No.: US 6,859,911 B1
(45) Date of Patent: Feb. 22, 2005

(54) GRAPHICALLY REPRESENTING DATA VALUES

(75) Inventor: Andrei M. Herasimchuk, Palo Alto, CA (US)

(73) Assignee: Adobe Systems Incorporated, San Jose, CA (US)

(*) Notice: Subject to any disclaimer, the term of this patent is extended or adjusted under 35 U.S.C. 154(b) by 642 days.

(21) Appl. No.: 09/784,931

(22) Filed: Feb. 15, 2001

Related U.S. Application Data (60) Provisional application No. 60/183,174, filed on Feb. 17, 2000.

(51) Int. Cl.[7] .................................................. G09F 5/00
(52) U.S. Cl. ..................... 715/764; 345/440; 345/440.1; 345/440.2
(58) Field of Search .................................. 345/627, 680, 345/682, 440, 440.1, 440.2, 442; 715/700

(56) References Cited

U.S. PATENT DOCUMENTS 6,297,828 B1 * 10/2001 Fukuzawa .................... 345/443
6,603,477 B1 * 8/2003 Tittle ........................... 345/440
6,667,743 B2 * 12/2003 Bertram et al. ............. 345/440

* cited by examiner

*Primary Examiner*—Ba Huynh
*Assistant Examiner*—Mylinh Tran
(74) *Attorney, Agent, or Firm*—Fish & Richardson P.C.

(57) ABSTRACT

Methods and apparatus for graphically representing current data values and possible data values associated with a quantifiable image property. A method includes the steps of displaying to a user a line that represents a range of current data values, displaying to a user a two-dimensional coordinate space in which the two dimensions are respectively parallel to and normal to the line, and representing a range of possible data values by distances along the normal dimension of the coordinate space from corresponding current data values on the line.

25 Claims, 4 Drawing Sheets

GRAPHICALLY REPRESENTING DATA VALUES

CLAIM OF PRIORITY

This application claims priority under 35 USC §119(e) to U.S. patent application Ser. No. 60/183,174, filed on Feb. 17, 2000, the entire contents of which are hereby incorporated by reference.

BACKGROUND

This invention relates to the graphic representation of data values.

Digital images used to represent and convey information to a computer user may take a variety of forms such as alphanumeric characters, graphs, and pictures. Digital images may be stored digitally, manipulated, and then rendered on video monitors or printers.

Digital images may have a variety of properties such as color, texture, brightness, contrast, and may be associated with nonvisual properties such as speed of motion or sound effects. The properties of an image may be defined when the image is created or modified and may be stored with the image.

Image properties are generally quantifiable. For example, the brightness of each pixel or other part of an image may be expressed as a quantity that may vary between 0% white (i.e., 100% black) and 100% white. Quantifiable image properties may be modified through mathematical translations of the data values that define the image properties of the parts of the image. In some systems, the user may alter the data values defining one or more image properties by using a keyboard or other input device. In other systems, a user may modify image properties through a graphical user interface (GUI). For example, a range of possible data values may be displayed graphically to the user and the user may select the desired new data value with a mouse or other pointing device.

Figure 2:
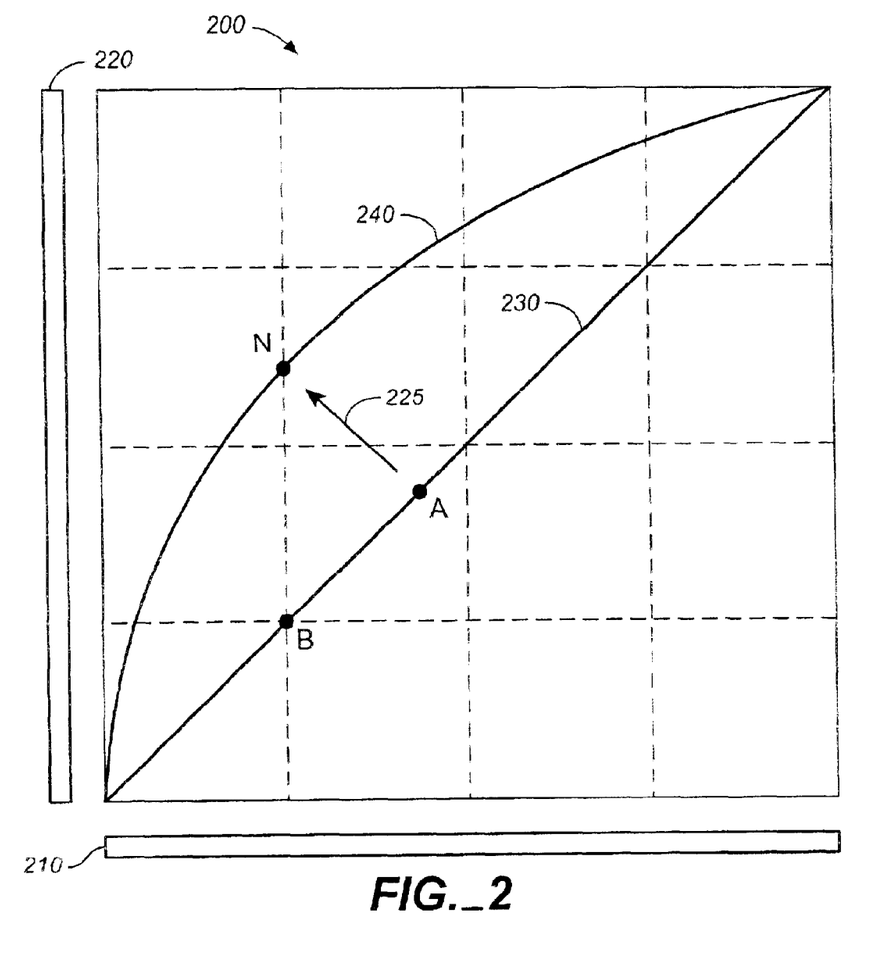
FIG. 2 is a prior art graphical user interface used for modifying image properties.

One particular GUI used to alter image properties uses a control tab of the kind shown in FIG. 2. A square 200 representing an x-y coordinate system is displayed to the user. The range of base data values for the image property (image brightness is shown in FIG. 2) is displayed graphically along the bottom horizontal edge (the x-coordinate) 210 of the square, while the range of possible new data values is displayed graphically along the left vertical edge (the y-coordinate) 220 of the square. The diagonal line 230 from the bottom left to the top right corner of the square represents a base state in which each base data value is identical to the new data value (i.e., x=y), indicating that no mathematical transformation has yet been performed. Each point on the line represents all of the pixels (or other parts) of the image that have the brightness value indicated on the x-axis.

To alter the image property the user may select a point on the diagonal line (e.g., point A) and drag it to a new position within the square (e.g., point N). Software then generates a new curve 240 that passes through the endpoints of the diagonal line and the new position of the point. The shape of curve 240 depends on choices made by the software designer. The curve 240 defines a mathematical translation of old data values into new data values. Every point along curve 240 has an x-y coordinate, where the horizontal, x-coordinate represents the old data value and the vertical, y-coordinate represents a corresponding new data value. Thus, when the transformation defined by the new curve is applied, every pixel having an old brightness value of x will assume a new brightness value of y. In this way, the brightness characteristics of the whole image can be altered. For example, dark pixels can be made lighter.

The GUI shown in FIG. 2 can be confusing to a user. The diagonal line indicating the base state of no change has a constant slope that users may interpret as implying a constantly increasing change of pixel brightness rather than a lack of change, because rising lines in x-y coordinate systems usually represent constant change. Moving point A to destination N (as indicated by arrow 225) to create a new curve may give the impression that the old data value associated with point A (the x-coordinate of point A) has acquired the new data value associated with point N (the y-coordinate of point N). In fact, it is the old data value associated with point B, located directly below point N, that has acquired the new data value associated with point N, because the x-coordinates of points N and B are identical.

SUMMARY OF THE INVENTION

In general, in a first aspect, the invention features a method of graphically representing base data values and possible data values associated with a quantifiable image property including the steps of displaying to a user a line that represents a range of base data values, displaying to a user a two-dimensional coordinate space in which the two dimensions are respectively parallel to and normal to the line, and representing a range of possible data values by distances along the normal dimension of the coordinate space from corresponding base data values on the line.

Implementations of the invention may include the following features. The line may be displayed horizontally and the coordinate space may be skewed from the horizontal direction. The two-dimensional coordinate space may be a polygon, wherein two nonadjacent vertices of the polygon coincide with the ends of the horizontal line in the two-dimensional coordinate space. The polygon may be a parallelogram, wherein the parallelogram includes a first vertical side parallel to a second vertical side and a first skewed side parallel to a second skewed side. The possible data values represented by endpoints of the first vertical side and the second vertical side may include the minimum and maximum of the range of possible data values, wherein the possible data values represented by points on the first skewed side comprise the minimum of the range of possible data values, and wherein the possible data values represented by points on the second skewed side comprise the maximum of the range of possible data values. The data values may be used in a computer graphics display, and the quantifiable image property may include brightness or color.

In another aspect, the invention features a method of interactively transforming a graphical representation of data values associated with a quantifiable image property including the steps of displaying to a user a line that represents a range of base data values, displaying to a user a two-dimensional coordinate space in which the two dimensions are respectively parallel to and normal to the line, representing a possible range of data values by distances along the normal dimension of the coordinate space from corresponding base data values on the line, and interactively providing a curve in the coordinate space, a change in each base data value corresponding to the distance along the normal dimension of the coordinate space from the curve to the point on the line representing the base data value.

Implementations of the invention may include the following features. Interactively providing a curve in the coordinate space may include selecting a point on the line, dragging the point to a new position in the coordinate space, and defining a curve in the coordinate space through the ends of the line and through the new position of the point. The tangent to the curve at the new position of the point may be parallel to the line. Interactively transforming a graphical representation of data values associated with a quantifiable image property may further include displaying to a user the base data value of the selected point, and displaying to a user the new data value of the point as it is dragged. One or more nodes in the coordinate space may be defined and a curve in the coordinate space through the ends of the line and through the nodes may be defined. The tangent to the curve at each node may be parallel to the line.

In a further aspect, the invention features method of graphically representing old data values and new data values, the data values being associated with a quantifiable image property, including displaying to a user a line that represents a range of old data values, displaying to a user a two-dimensional coordinate space in which the two dimensions are respectively parallel to and normal to the line, representing new data values with a curve in the coordinate system, and displaying a line along the normal dimension of the coordinate system between an extremum of the curve and the line.

DETAILED DESCRIPTION

Figure 3:
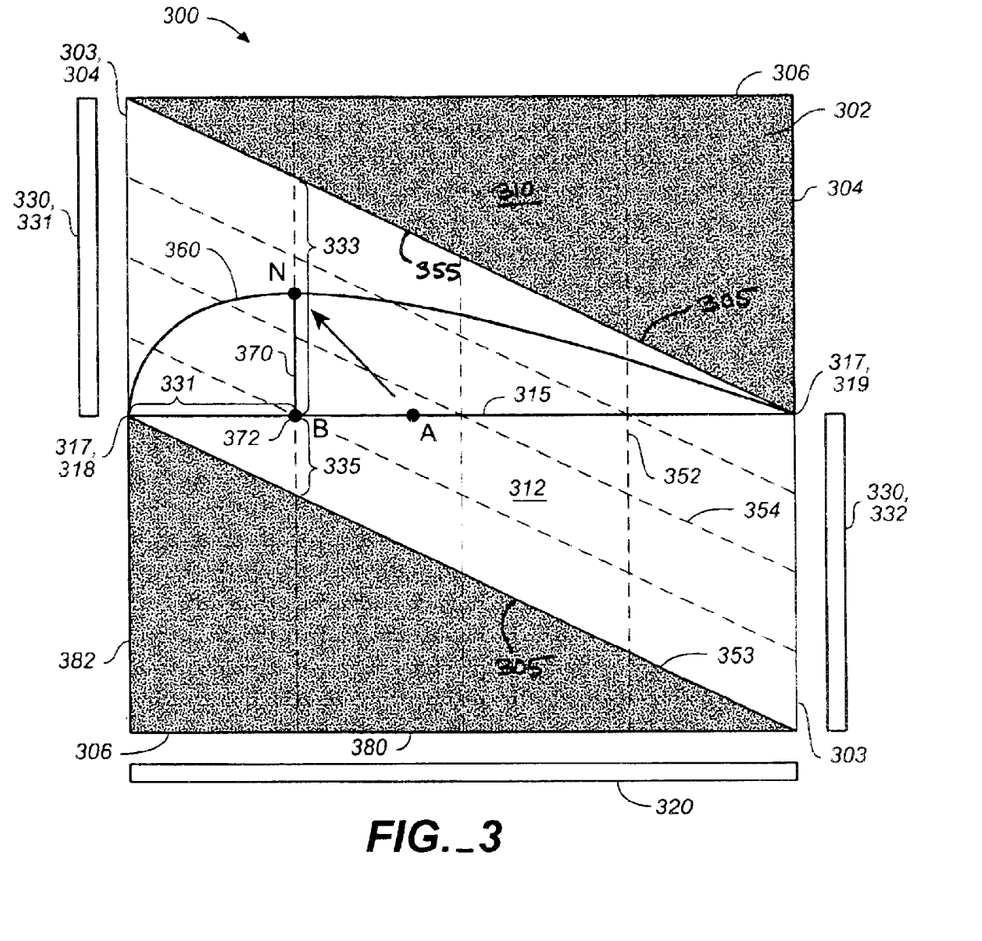
FIG. 3 is a graphical user interface used for modifying image properties in accordance with the invention.

As shown in FIG. 3, a GUI display image 300 includes a square 302 that defines an x-y coordinate system used for modifying the data values associated with quantifiable image properties. The x-coordinate runs along the horizontal direction of square 302 and the y-coordinate runs along the vertical direction of the square, although (unlike a conventional rectilinear coordinate system) a given value of y occupies a vertical position that depends on its location along x-axis. The square 302 contains an inactive background region 310 and an active region 312 in the shape of a parallelogram that is, for example, lighter in color and therefore visually distinguishable from inactive background region 310. Two sides 303 of the parallelogram active region 312 are parallel to the vertical sides 304 of square 302, while two sides 305 of parallelogram active region 312 are skewed from the direction of the horizontal sides 306 of the square. A straight, horizontal line 315 in active region 312 runs parallel to the horizontal sides 306 of square 302, between the two vertices 317 that form the obtuse angles of parallelogram active region 312. (In this context, the term "line" refers a line segment, a straight segment of finite length.)

The straight, horizontal line 315 represents a range of base data values assigned to the image property to be modified (for example, the brightnesses of pixels in an image), and active region 312 represents the parameter space of data values that may be assigned when the base range of data values is modified. The x-coordinate 331 of a point on line 315 corresponds to a base data value within the range of base data values assigned to an image property to be modified. The y-coordinate in active region 312 directly above 333 or below 335 a point on line 315 corresponds to a possible new data value that may be assigned to the point when the image property is modified.

Horizontal line 315, representing base data values for an image property, combined with parallelogram active region 312, representing possible new data values for an image property, provides an intuitive graphical space for translating base data values into new data values. The ends of horizontal line 315 represent the extrema of a range of base data values. For example, in FIG. 3, where brightness is the image property to be modified, the ends of horizontal line 315 correspond to 0% and 100% brightness, and points on line 315 between the ends correspond to intermediate brightness values. Since the points at the ends of horizontal line 315 correspond to the extrema of the range of base data values, upon modification the point at one end of the line 315 may only acquire a larger value and the point at the other end of the line 315 may only acquire a smaller value. Thus, at one end of horizontal line 315 available space in active region 312 exists only above point 318, because the data value assigned to this point can only increase, while at the other end of line 315 space in active region 312 exists only below point 319, because the data value assigned to this point can only decrease. Graphically, this requires that parallelogram vertices 317 coincide with the ends of horizontal line 315.

Points on horizontal line 315 between the ends 317 of the line correspond to base data values intermediate between the minimum and maximum of the range of values. Since they are intermediate values, they may be either increased or decreased when modified and, therefore, space exists in active region 312 both above and below line 315 for every point on the line except for the endpoints 317. For example, in FIG. 3, the point 318 at the left end of line 315 represents a data value indicating minimum brightness, so active space only exists above point 318, while the point 319 of at the right end of line 315 represents a data value that indicating maximum brightness, so active space only exists below point 319. The point in the middle of line 315 represents 50% brightness and can increase to 100% brightness or decrease to 0% brightness, which is why the active space above it is equal to the active space below it.

A graphical bar 320 representing the range of data values currently assigned to the image property runs parallel to the bottom edge 306 of the square 302. For example, in FIG. 3, the image property to be changed is brightness, and graphical bar 320 displays the range of brightness from 0% brightness at the left end of graphical bar 320 to 100% brightness at the right end of graphical bar 320.

In addition to horizontal bar 320 in image 300, vertical graphical bars 330, representing the range of possible data values that may be assigned to the image property when it is modified, run parallel to the vertical sides 304 of square 302. Vertical graphical bars 330 do not run the entire length of the vertical sides 304 of the square. Rather, they run parallel to the vertical sides of parallelogram active region 312. Graphical bar 331 becomes brighter as it goes up because the brightness of point 318 can only increase, while graphical bar 332 becomes darker as it goes down because the brightness of point 319 can only decrease.

A nonorthogonal grid may be drawn inside active region 312. Vertical grid lines 352 parallel to the sides 304 of square 302 indicate lines of constant base data values. Skewed lines 354, parallel to the skewed sides of parallelogram active region 312 indicate lines of constant possible data values that the base data values may acquire through a modification of an image property. For example, in FIG. 3, line 353 at the bottom of parallelogram active region 312 indicates 0% brightness, line 355 at the top of parallelogram active region 312 indicates 100% brightness and line 354 midway between, and parallel to, lines 353 and 355 indicates 50% brightness.

A user may modify the data values associated with a quantifiable image property by altering the horizontal line 315. A user may select a starting point, e.g., point A, on horizontal line 315 with a mouse or other pointing device and drag the point to a new location in active region 312, e.g., point N. When the user stops dragging the starting point and releases it in active region 312, a new line 360 (which in general may be a curved segment of essentially any shape) is created and drawn though the ends 317 of line 315 and the new position, point N, of the point the user has dragged. In one implementation, the tangent to new line 360 at point N is parallel to horizontal line 315. New line 360 defines the modification of the data values associated with the quantifiable image property, in that the x-coordinate of a point on new line 360 corresponds to the old data value and the y-coordinate of the point on new line 360 corresponds to the new data value. Thus, for example, dragging starting point A on line 315 in FIG. 3 to point N on new line 360 causes grays of 25% brightness in the original image to acquire a value of approximately 66% brightness.

Further referring to FIG. 3, when a user drags a point on line 315 to a new location, e.g., point N, a vertical line 370 perpendicular to line 315, from point N to line 315 can be displayed to the user. Vertical line 370 serves to remind the user that it is the x-coordinate of point N, rather than the x-coordinate of starting point A, that corresponds to the old data value when the image property is modified. A dot 372 at the base of vertical line 370 on line 315 can be displayed to further reinforce this notion.

New line 360, passing through end points 317 of line 315 and point N, may be displayed to the user while the starting point is being dragged and before the starting point is released by the user. New line 360 will necessarily change as the starting point is dragged to different locations within active region 312 until the point is released. Additionally, the value of the old data value and the new data value it will acquire when the starting point is released may be displayed either through graphical aids 380 or through a numerical display 382. For example, in FIG. 3, both graphical aids 380 and numerical display 382 indicate that moving starting point A to point N results in changing grays of 25% brightness to grays of 66% brightness.

Figure 4:
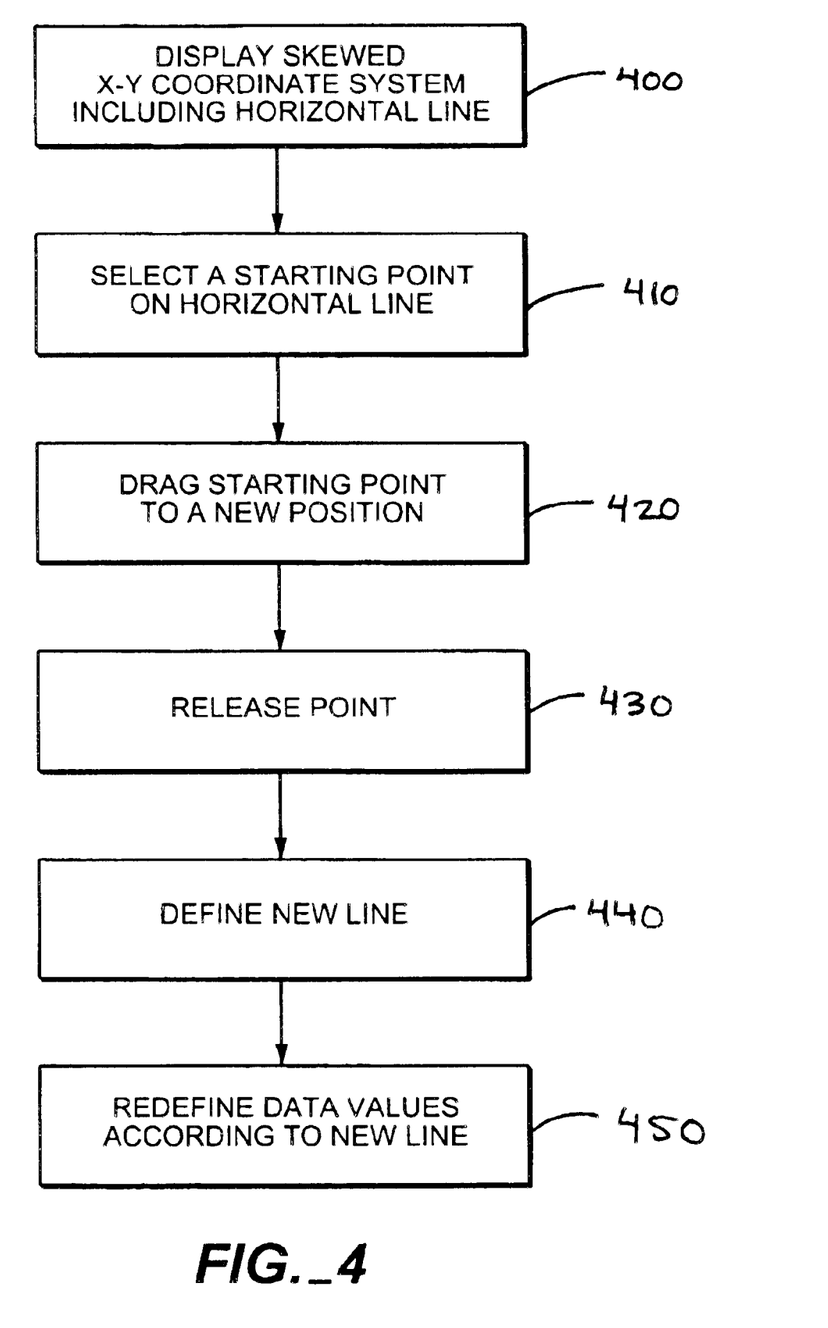
FIG. 4 is a flowchart of a method in accordance with the invention.

As shown in FIG. 4, data values corresponding to an image property may be modified with the use of an x-y coordinate system that includes a skewed active region and a horizontal line through the active region 400. The coordinate system, the active region and the horizontal line are displayed to a user 400. The user selects a point on the horizontal line 410, through the use of a mouse or other pointing device, which may include keyboard commands. The user then drags the selected point to a new location within the active region 420. While the selected point is dragged, a vertical line may be drawn from the point to the horizontal line. The user releases the selected point 430 at the desired destination point and a new line, passing through the ends of the horizontal line and through the destination point, is defined 440. Data values corresponding to the image property are redefined according to the shape of the new line 450.

Other embodiments are within the scope of the following claims.

For example, when an image property is modified by modifying the horizontal line and creating a new line, the new line need not be defined by only the endpoints of the horizontal line and a single point dragged by the user. More than one point on the horizontal line may be dragged to new positions and the new line may be defined to pass through all of the new positions of the points in addition to the endpoints of the horizontal line. The new line may also be defined by use of control points that the new line does not pass through. Furthermore, positions of points through which new line 360 passes need not be defined by dragging points from line 315, but may be defined by other selection methods, such as with a mouse or other such pointing device or by entering the new point's coordinates with, e.g., a keypad. The multiple new positions of points selected by the user may define the nodes of the new line that passes through them and define the shape of the new line.

The horizontal line that represents the range of base values need not be strictly horizontal. It can, for example, be vertical or at some angle to vertical or horizontal that is close enough to vertical or horizontal to provide the same benefits. In other arrangements, the line can be at any angle to horizontal or vertical if the skewed region showing the possible new values has a grid that is generally perpendicular to the line. The shape of the active region of possible new data values need not be a parallelogram.

The line 370 that shows the change in y-value for a base x-value is useful even with the known arrangement of FIG. 2.

A variety of mathematical or empirical functions may be used for drawing curve 360 to pass through the point N and the end points of line 315.

The relationship of (i) the normal distance of a point on new line 360 to line 315 to (ii) the change from old value to new value need not be linear. Thus, for example, the scale of the grid in the active region can be logarithmic in the normal direction.

The base values can be default values with the new line showing a current transformation from the default. The base values can also be values the resulted from a previously-performed transformation. Or, the base values can be selected in some other way.

The techniques described here may be implemented in hardware, software, or a combination of the two. The techniques may be implemented in computer programs executing on programmable computers that each include a processor, a storage medium readable by the processor, including volatile and nonvolatile memory and/or storage elements, and other suitable input and output devices.

Figure 1:
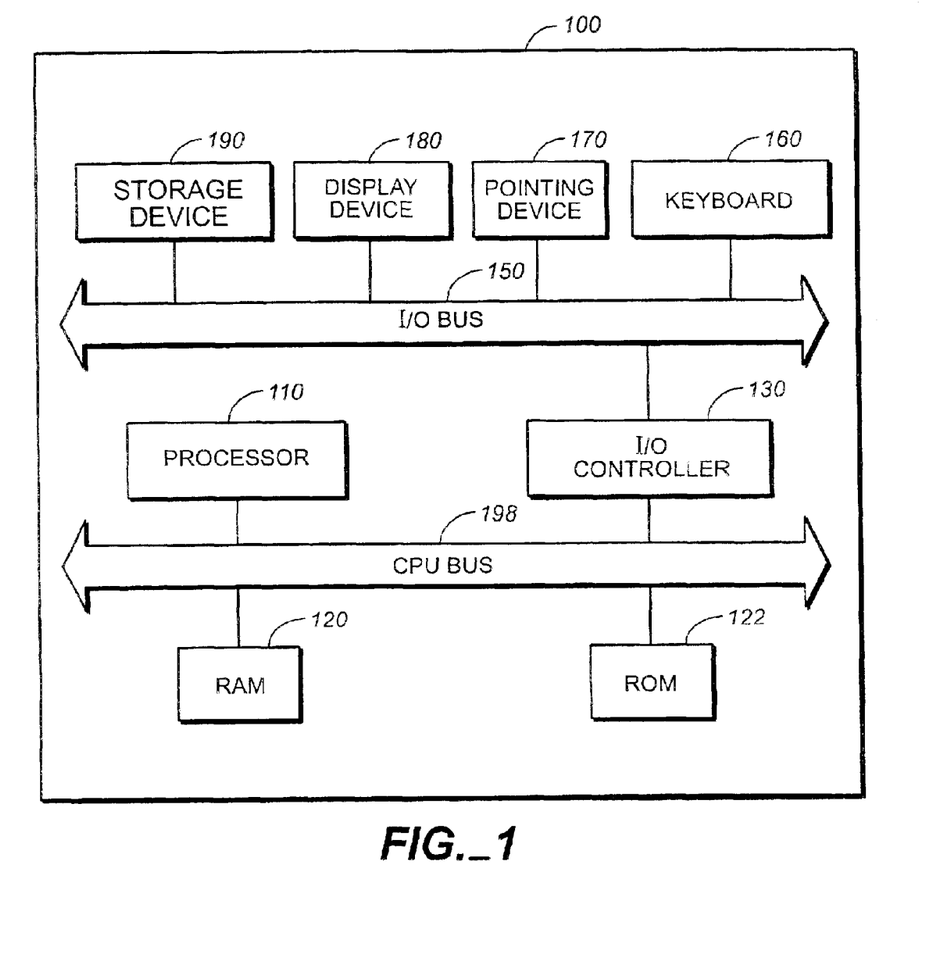
FIG. 1 is a block diagram of a computer system suitable for implementing the invention.

FIG. 1 illustrates one such computer system 100, including a central processing unit (CPU) 110, random access memory (RAM) 120, read only memory (ROM) 122 and an input/output controller 130 coupled by a CPU bus 140. The input/output controller 130 may also be coupled by an input/output bus 198 to input devices such as a keyboard 160, a pointing device 170, e.g., a mouse, and output devices such as a display device 180, e.g., a video monitor. A computer program implementing a routine that manages the control box shown in FIG. 3 may be stored in RAM 120, ROM 122, or on a storage medium or device 190, e.g., CD-ROM, hard disk or magnetic diskette. The computer program may be readable by a general or special purpose programmable computer for configuring and operating the computer to perform the techniques described here.

What is claimed is:

1. A method of graphically representing base data values and possible data values associated with a quantifiable image property, comprising:
   displaying to a user in a graphical user interface (GUI) a base state line that represents a range of base data values;
   displaying to the user in the GUI a two-dimensional coordinate space skewed from the base state line in which the two dimensions are respectively parallel to and normal to the line; and
   representing a range of possible data values in the two-dimensional coordinate space for each base data value as distances along the normal dimension of the two-dimensional coordinate space from the corresponding base data value on the base state line.

2. The method of claim 1 in which the base state line is displayed horizontally and the two-dimensional coordinate space is skewed from the horizontal direction.

3. The method of claim 1 wherein the two-dimensional coordinate space comprises a polygon, two non-adjacent vertices of the polygon coinciding with the ends of the base state line in the two-dimensional coordinate space.

4. The method of claim 3 wherein the polygon comprises a parallelogram, the parallelogram comprising a first vertical side parallel to a second vertical side and a first skewed side parallel to a second skewed side.

5. The method of claim 4 wherein:
   the possible data values represented by endpoints of the first vertical side and the second vertical side comprise the minimum and maximum of the range of possible data values;
   the possible data values represented by points on the first skewed side comprise the minimum of the range of possible data values; and
   the possible data values represented by points on the second skewed side comprise the maximum of the range of possible data values.

6. The method of claim 1, further comprising displaying an active region in the GUI representing a parameter space of data values that may be assigned when the range of base data values is modified.

7. A method of graphically representing base data values and possible data values associated with a quantifiable image property comprising:
   displaying to a user in a graphical user interface (GUI) a horizontal line that represents a range of base data values, where each point on the line represents all parts of an image that have an image property value indicated by the position of the point on the line;
   displaying to the user in the GUI a two-dimensional, parallelogram-shaped coordinate space, in which the two dimensions are respectively parallel to and normal to the horizontal line, wherein the parallelogram shaped coordinate space comprises a first vertical side and a second vertical side, parallel to the normal dimension of the coordinate space, and a first skewed side and a second skewed side, skewed from the direction of the horizontal line; and
   representing a range of possible data values by distances along the normal dimension of the coordinate space from corresponding current data values on the horizontal line, wherein the possible data values represented by endpoints of the first vertical side and the second vertical side comprise the minimum and maximum of the range of possible data values, and wherein the possible data values represented by points on the first skewed side comprise the minimum of the range of possible data values, and wherein the possible data values represented by points on the second skewed side comprise the maximum of the range of possible data values.

8. The method of claim 7 wherein the data values are used in a computer graphics display.

9. The method of claim 7 wherein the quantifiable image property comprises brightness.

10. The method of claim 7 wherein the quantifiable image property comprises contrast.

11. A method of interactively transforming data values associated with a quantifiable image property, comprising:
    displaying to a user in a graphical user interface (GUI) a line that represents a range of base data values associated with a quantifiable image property;
    displaying to the user in the GUI a two-dimensional coordinate space skewed from the line in which the two dimensions are respectively parallel to and normal to the line;
    representing a range of possible data values by distances along the normal dimension of the coordinate space from corresponding base data values on the line; and
    interactively providing displaying in the GUI a curve in the coordinate space that represents a transformation of each base data value corresponding to the distance along the normal direction in the coordinate space from the curve to a point on the line representing the base data value.

12. The method of claim 11 wherein interactively displaying in the GUI a curve in the coordinate space comprises:
    receiving from the user an input selecting a point on the line;
    receiving from the user an input moving the selected point to a new position in the coordinate space; and
    defining a curve in the coordinate space through the ends of the line and through the new position of the point.

13. The method of claim 11 wherein the tangent to the curve at the new position of the point is parallel to the line.

14. The method of claim 11 further comprising:
    displaying to the user in the GUI the base data value of the selected point; and
    displaying to the user in the GUI the new data value of the point as it is dragged, the new data value being determined by the normal distance from the line to the point.

15. The method of claim 11 wherein interactively displaying in the GUI a curve in the coordinate space comprises:
    defining one or more nodes in the coordinate space; and
    defining a curve in the coordinate space through the ends of the line and through the one or more nodes.

16. The method of claim 15 wherein the tangent to the curve at each node is parallel to the line.

17. A method of graphically representing base data values and transformed data values, the data values being associated with a quantifiable image property, comprising:
    displaying to a user in a graphical user interface (GUI) a line that represents a range of base data values;
    displaying to the user in the GUI a two-dimensional coordinate space skewed from the line in which the two dimensions are respectively parallel to and normal to the line;
    representing transformed data values with a curve in the coordinate system; and
    displaying in the GUI a line along the normal dimension of the coordinate system between an extremum of the curve and the line.

18. A computer program residing on a computer-readable medium, comprising instructions operable to cause a computer to:
  display to a user in a graphical user interface (GUI) a line that represents a range of base data values associated with a quantifiable image property;
  display to the user in the GUI a two-dimensional coordinate space skewed from the line in which the two dimensions are respectively parallel to and normal to the line; and
  represent a range of possible data values in the two-dimensional coordinate space by as distances along the normal dimension of the coordinate space from corresponding base data values on the line.

19. A computer program residing on a computer-readable medium, comprising instructions operable to cause a computer to:
  display to a user in a graphical user interface (GUI) a line that represents a range of current data values associated with a quantifiable image property;
  display to the user in the GUI a two-dimensional coordinate space skewed from the line in which the two dimensions are respectively parallel to and normal to the line;
  represent a possible range of data values in the two-dimensional coordinate space by as distances along the normal dimension of the coordinate space from corresponding current data values on the line; and
  interactively display in the GUI a curve in the coordinate space based on input from the user that represents a change in each current data value corresponding to the distance along the normal dimension of the coordinate space from the curve to the point on the line representing the current data value.

20. A computer program residing on a computer-readable medium, comprising instructions operable to cause a computer to:
  display to a user in a graphical user interface (GUI) a line that represents a range of old data values associated with a quantifiable image property;
  display to the user in the GUI a two-dimensional coordinate space skewed from the line in which the two dimensions are respectively parallel to and normal to the line;
  represent new data values with a curve in the coordinate system; and
  display a line in the GUI along the normal dimension of the coordinate system between an extremum of the curve and the line that shows a correspondence between an old data value on the line and a new data value indicated by the curve.

21. A computer system for graphically representing base data values and possible data values associated with a quantifiable image property, comprising:
  a means for displaying to a user in a graphical user interface (GUI) a line that represents a range of base data values;
  a means for displaying to the user in the GUI a two-dimensional coordinate space skewed from the line in which the two dimensions are respectively parallel to and normal to the line; and
  a means for representing a range of possible data values in the two-dimensional coordinate space as distances along the normal dimension of the coordinate space from corresponding base data values on the line.

22. A computer system for interactively transforming a graphical representation of data values associated with a quantifiable image property, comprising:
  a means for displaying to a user in a graphical user interface (GUI) a line that represents a range of base data values;
  a means for displaying to the user in the GUI a two-dimensional coordinate space skewed from the line in which the two dimensions are respectively parallel to and normal to the line;
  a means for representing a range of possible data values in the two-dimensional coordinate space as distances along the normal dimension of the coordinate space from corresponding base data values on the line; and
  a means for interactively displaying in the GUI a curve in the coordinate space that represents a change in each current data value corresponding to the distance along the normal dimension of the coordinate space from the curve to the point on the line representing the current data value.

23. A computer system for graphically representing old data values and new data values, the data values being associated with a quantifiable image property, comprising:
  a means for displaying to a user in a graphical user interface (GUI) a line that represents a range of old data values;
  a means for displaying to the user in the GUI a two-dimensional coordinate space skewed from the line in which the two dimensions are respectively parallel to and normal to the line;
  a means for representing new data values with a curve in the coordinate system; and
  a means for displaying in the GUI a line along the normal dimension of the coordinate system between an extremum of the curve and the line.

24. A computer system for interactively transforming a graphical representation of data values associated with a quantifiable image property, comprising:
  a means for displaying to a user in a graphical user interface (GUI) a line that represents a range of current data values;
  a means for displaying to the user in the GUI a two-dimensional coordinate space skewed from the line in which the two dimensions are respectively parallel to and normal to the line;
  a means for representing a possible range of data values in the two-dimensional coordinate space as distances along the normal dimension of the coordinate space from corresponding current data values on the line; and
  a means for interactively displaying in the GUI a curve in the coordinate space, that represents a change in each current data value corresponding to the distance along the normal dimension of the coordinate space from the curve to the point on the line representing the current data value.

25. A computer system for graphically representing old data values and new data values, the data values being associated with a quantifiable image property, comprising:
  a means for displaying to a user in a graphical user interface (GUI) a line that represents a range of old data values;
  a means for displaying to the user in the GUI a two-dimensional coordinate space skewed from the line in which the two dimensions are respectively parallel to and normal to the line;
  a means for representing new data values with a curve in the coordinate system; and
  a means for displaying in the GUI a line along the normal dimension of the coordinate system between an extremum of the curve and the line.

* * * * *

UNITED STATES PATENT AND TRADEMARK OFFICE
CERTIFICATE OF CORRECTION

PATENT NO.     : 6,859,911 B1
DATED          : February 22, 2005
INVENTOR(S)    : Andrei M. Herasimchuk It is certified that error appears in the above-identified patent and that said Letters Patent is hereby corrected as shown below:

<u>Column 8,</u>
Line 23, delete "providing";

<u>Column 9,</u>
Lines 12 and 26, delete "by".

Signed and Sealed this

Seventeenth Day of May, 2005

JON W. DUDAS
*Director of the United States Patent and Trademark Office*